US006304840B1

(12) United States Patent
Vance et al.

(10) Patent No.: US 6,304,840 B1
(45) Date of Patent: Oct. 16, 2001

(54) FINGERLESS GLOVE FOR INTERACTING WITH DATA PROCESSING SYSTEM

(75) Inventors: Scott Vance, Cary, NC (US); Larisa Migachyov, Stanford, CA (US); Wayne Fu, Reno, NV (US); Ira Hajjar, San Jose, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/107,527

(22) Filed: Jun. 30, 1998

(51) Int. Cl.[7] .................. G06F 9/44; G06F 13/10
(52) U.S. Cl. .................. 703/21; 341/20; 702/150
(58) Field of Search .................. 703/13, 20–22; 200/6; 341/20; 704/271; 414/5; 345/158; 700/6; 702/150

(56) References Cited

U.S. PATENT DOCUMENTS

| 4,414,438 | * | 11/1983 | Maier ................................ 200/6 |
| 4,414,537 | * | 11/1983 | Grimes .............................. 341/20 |
| 5,047,952 | * | 9/1991 | Kramer et al. ................. 704/271 |
| 5,143,505 | * | 9/1992 | Burden et al. .................... 414/5 |
| 5,280,265 | * | 1/1994 | Kramer et al. ................. 338/210 |
| 5,444,462 | * | 8/1995 | Wambach ........................ 345/158 |
| 5,581,484 | * | 12/1996 | Prince .............................. 702/150 |
| 5,610,528 | * | 3/1997 | Neely et al. .................... 324/660 |
| 6,084,576 | * | 7/2000 | Leu et al. ........................ 345/168 |

OTHER PUBLICATIONS

Hong et al, "Calibrating a VPL DataGlove for Teleoperating the Utah/MIT Hand", IEEE Proceedings of the International Conference on Robotics and Automation, vol. 3 pp. 1752–1757, May 1989.*

* cited by examiner

*Primary Examiner*—Kevin J. Teska
*Assistant Examiner*—Samuel Broda
(74) *Attorney, Agent, or Firm*—Peter Verdonk

(57) ABSTRACT

A data glove is used for enabling ten-finger-typing with a virtual keyboard. The angle at which the user's; finger bends at the proximal interphalangeal joint is used to decode a particular row of the keyboard. Each finger controls one or more columns. Discrimination between columns operated by the same finger is achieved through an abduction/adduction sensor. The glove is fingerless and allows normal hand functions in addition to the virtual typing

22 Claims, 3 Drawing Sheets

FINGERLESS GLOVE FOR INTERACTING WITH DATA PROCESSING SYSTEM

FIELD OF THE INVENTION

The invention relates to a system for processing information comprising an apparatus for manually controlling information input. The invention further relates to such an apparatus.

BACKGROUND ART

Such a system is known from U.S. Pat. No. 5,581,484, incorporated herein by reference. The known system has a finger-mounted input device for manually entering information into a computer. The device uses a pressure sensor and a pair of acceleration sensors removably attached to the finger tip of a user. The pressure sensor senses a pressure when the finger presses against an object, e.g., a table surface. The acceleration sensors measure the acceleration of the finger. The sensors are mounted in a flexible glove. The signals of the sensors are relayed to a computer that calculates the relative position of the finger. Twice integrating an acceleration measured gives a coordinate of the current position of the finger relative to a begin position. The pressure sensor is used to validate the signal of the acceleration sensors. The known system allows a user to enter data into the system as if he or she were typing on a physical keyboard, such as the standard QWERTY keyboard.

OBJECT OF THE INVENTION

It is an object of the invention to provide an alternative input devices. Further, the known input device covers the users hand, palm, thumb and fingers. The inventors have recognized that such an embodiment impedes functions of the hand other than interacting with a keyboard, such as opening a can of soda, picking up the telephone, scribbling something on a notepad, consulting a dictionary, or simply blowing one's nose. It is therefore a further object of the invention to provide a more user-friendly alternative to the known system.

SUMMARY OF THE INVENTION

To this end, the invention provides a system for processing information. The system comprises a computer and an apparatus that is mountable to a hand of a user. The apparatus enables user-interaction with the computer based on a bending of a user's finger. The system maps the finger's bending at an angle in a specific range onto a specific one of multiple information items. The bending is sensed, e.g., at the finger's proximal interphalangeal joint or the metacarpophalangeal joint. The apparatus preferably comprises a glove that leaves uncovered at least an upper part of at least one of the user's fingers. The apparatus communicates with the computer via a wired or wireless connection. In the latter case, the user-friendliness of the fingerless glove as a manual computer input device is increased even more. The communication preferably uses IR so that the gloves can be used with a laptop while the user is traveling by plane. As known, passengers are not allowed to operate their personal RF devices onboard a plane.

The invention is based on the insight that when a person is interacting with a manual computer input device, e.g., a QWERTY keyboard, the angle at which the finger bends can be used to decode a specific data entry, here a key. The angle is sensed by using, for example, a strain gauge, a switch with multiple positions (e.g., mechanical or magnetic), a potentiometer, a tube with resistance that changes its, resistance when stretched, conductive rubber, etc. A key hit is sensed by an accelerometer suitably placed, e.g., over the proximal interphalangeal joint, the metacarpophalangeal joint or over the proximal phalanx. Alternatively, a key hit is sensed by an abrupt rate of change of the angle measured, or a mechanical of electric switch at one or more of the joints.

In the preferred embodiment, the glove leaves uncovered the upper part of the user's finger. Accordingly, normal finger functions are not impeded and the glove permits full sensation in the fingertips. The invention can be used to enter data into the computer via a virtual alphanumeric keyboard, or a virtual musical keyboard. The virtual keyboard is merely a rigid surface to tap one's fingers on. The invention can be used in a variety of ways that permit entering data into a computer based on the angle of the user's fingers, e.g., playing a virtual wind instrument like a clarinet or a flute. In the latter case, additional data could be entered based on a pressure applied to the instrument's mouth piece.

The inventors have also recognized that a specific finger may control more than one column of keys. For example, interacting with a QWERTY-keyboard using ten-finger typing typically lets the index finger and the small finger each control two or more columns. Preferably, a lateral selection mechanism is added to the longitudinal selection mentioned above in order to distinguish between abduction and adduction of the finger. For example, a magnetic reed switch is mounted on the index finger and a magnet on a neighboring finger. Alternatively, a strain gauge is mounted in the portion between the index and middle finger. This portion is susceptible to stretching when the lateral distance between these fingers increases. Alternatively, a magnet and a Hall sensor is used to measure abduction. A variety of sensing mechanisms, both for the longitudinal and lateral orientations is feasible, based on sensing a magnitude of a particular quantity or a change in a physical quantity, e.g., distance or proximity, angle, moment of force, etc. The little finger of the right hand is typically used to control three or more columns. In order to discriminate between more than two columns, the lateral selection mechanism comprises, for example, multiple sensors with different sensitivity ranges or multi-position switches.

A typical PC keyboard comprises more keys than the ones for a QWERTY functionality. For example, the PC-keyboard has a row of keys for the Arabic numerals 1, 2, . . . , 9, and 0, and a row of function keys. Accordingly, such a keyboard has five rows: three for QWERTY, one for the Arabic numerals, and one for the function keys. One way to discriminate between the rows is to have the sensors introduced above being capable of sensing in at least five different locations on the device, and of generating a respective signal corresponding to a respective one of the locations. Another way is to have a sensor mounted to the user's hand that changes the interpretation of the virtual row being controlled when the sensor is activated. For example, the sensor is mounted to the palm of the hand and gets activated when the user presses down his/her palm. Thereupon, the signals from the sensing subsystem are interpreted as originating from the function keys or the Arabic numeral keys.

The device preferably also comprises visual indications as to the functionality or functionalities of the keys to be operated by the device. For example, a glove implementation of the invention for use with a virtual QWERTY keyboard has characters printed on a portion visible to the user (e.g., on the fingers of the glove or on the back of the hand near the base of each finger) so as to facilitate wielding the device properly by the uninitiated user.

The glove is preferably programmable in the sense that the user can calibrate its sensors so as to get the glove adapted to his/her finger size or movements. For example, the user sets the sensors by stretching and bending the fingers and spreading them. The sensors thus are made to give signals according to the fingers' extreme positions. The computer software can therefore adapt to the range of the user's movements.

The invention is especially useful in combination with a virtual desktop system as disclosed in U.S. patent application Ser. No. 08/887,593 (PHA 23,258), incorporated herein by reference.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
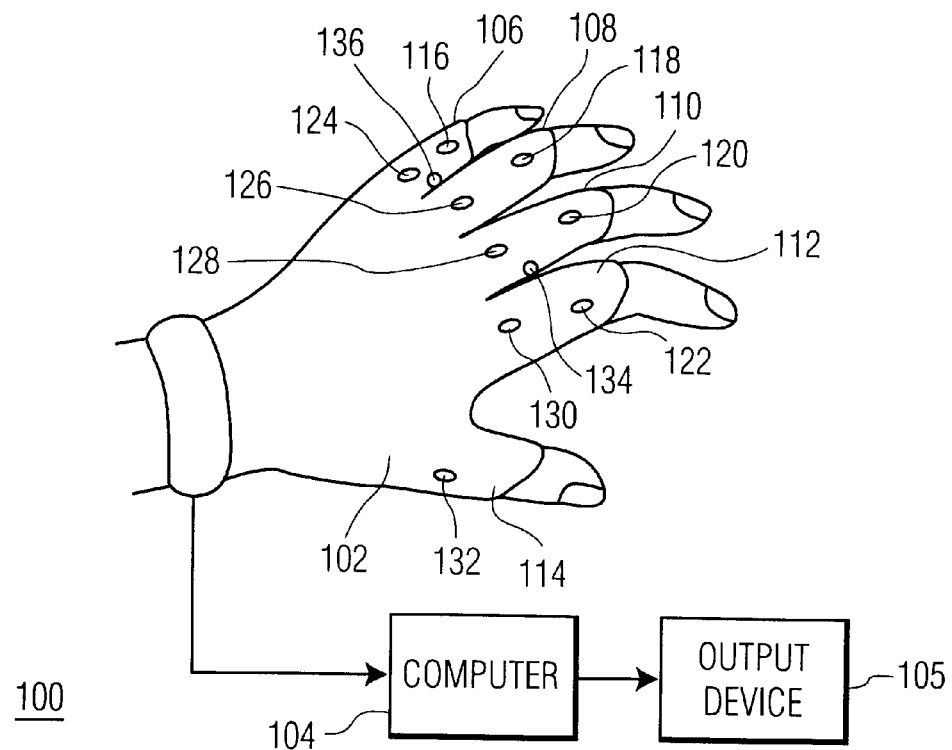
FIG. 1 is a diagram of a first embodiment of a system in the invention.

FIG. 1 is a block diagram with the main components of an information processing system 100 according the invention. System 100 comprises an apparatus 102. Apparatus includes a glove that leaves the user's finger tips uncovered. System 100 further has a computer 104 and an output device 105. Glove 102 is worn by the user in order to manually enter information into computer 104. The information entered is based on detection of a bending of the user's fingers and thumbs. The bending of the a specific, finger at a particular angle can be interpreted as selecting a designated virtual key of, for example, a virtual alpha-numeric keyboard, the keys of a virtual piano or the valves of a virtual clarinet. Output device 105 gives, for example, auditory or visual feedback to the user. Although the drawing shows a single glove 102, it is clear that two gloves may be required by some applications.

Preferably, glove 102 leaves uncovered the tips of the user's fingers and thumb. In the example shown, the distal phalanges and the distal interphalangeal joints are left exposed, whereas the proximal phalanges and proximal interphalangeal joints are covered. Locations 106, 108, 110, 112 and 114 correspond with those of the interphalangeal joints of the fingers and thumb. The inventors have found that the angle between the proximal and middle phalanges of the fingers can be used to code user input via, e.g., a virtual or imaginary QWERTY keyboard. This is explained with reference to FIG. 2.

Figure 2:
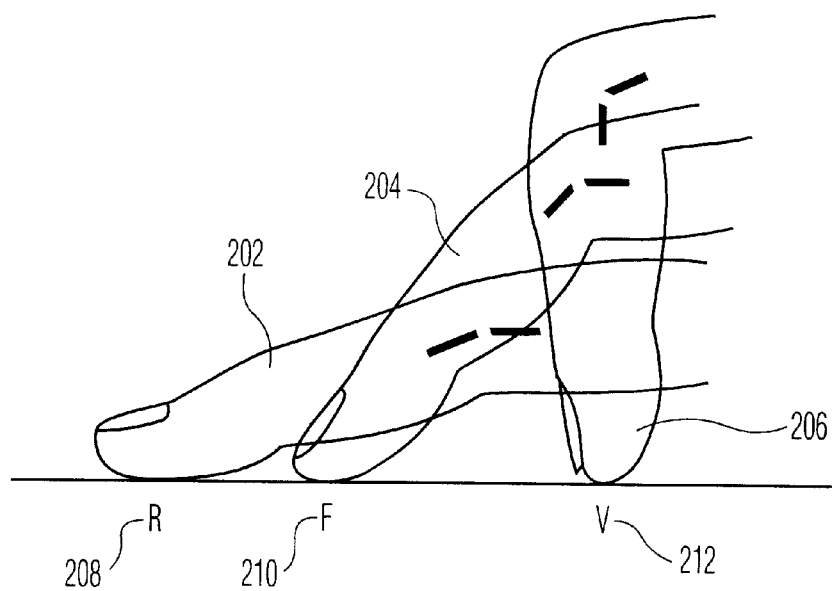
FIG. 2 is a diagram illustrating the different orientations and angles of a typist's finger.

FIG. 2 illustrates the different orientations 202, 204 and 206 of a left index finger when typing on a real QWERTY keyboard. For example, the typist's left index finger controls keys 208, 210 and 212 for the letters "R", "F", and "V", located in an upper row, a middle row and a lower row, respectively, of the keyboard. The finger strikes different ones of keys 208–212 so that the finger bends at different angles at the proximal interphalangeal joint as the user types letters in different rows of the keyboard. The angle is greater for higher-row characters than for lower-row characters. Accordingly, the bending of the finger is representative of the row wherein a key is activated. The invention now uses these angles to decode the rows wherein the keys reside that are operated by each finger in a ten-finger typing method. The user merely has to tap with his/her fingers on a more or less rigid surface such as a table, one's knees, or the head of a friend (according to one of the inventors) to generate the signals representative of keystrokes, that are entered into computer 104.

Glove 102 accommodates sensors 116, 118, 120 and 122 at or near locations 106–112 that sense the angle. Sensors 116–122 each comprise for example, a strain gauge, a switch with multiple positions (e.g., mechanical or magnetic), a potentiometer, a tube with resistance that changes its resistance when stretched, conductive rubber, etc. In a preferred embodiment strain gauges were used of the 500 UW series manufactured by Measurements Group, Inc. The strain gauges were mounted on a flexible substrate so as to be able to establish a firm connection between the sensors and the flexible fabric of the glove. The substrates were removably inserted into pockets on the back of the glove's fingers.

Sensors 116–122 can be used to register a key hit. For example, an abrupt change in the rate at which the angle decreases indicates a key hit. Alternatively, glove 102 has additional sensors 124, 126, 128, 130, 132: e.g., a sensor to sense an angle, e.g., at the metacarpophalangeal joint (that is where the finger or thumb joins the hand), e.g., of a similar type as of sensors 116–122. Some pre-determined combinations of angle values per finger indicate a key hit, possibly after calibration through computer 104, or the abrupt change of the angle at the metacarpophalangeal joint indicates a hit. Alternatively, sensors 124–132 each comprise a mechanical, electric or magnetic switch that closes upon the angle at the metacarpophalangeal or proximal interphalangeal joint reaching a particular magnitude.

Figure 3:
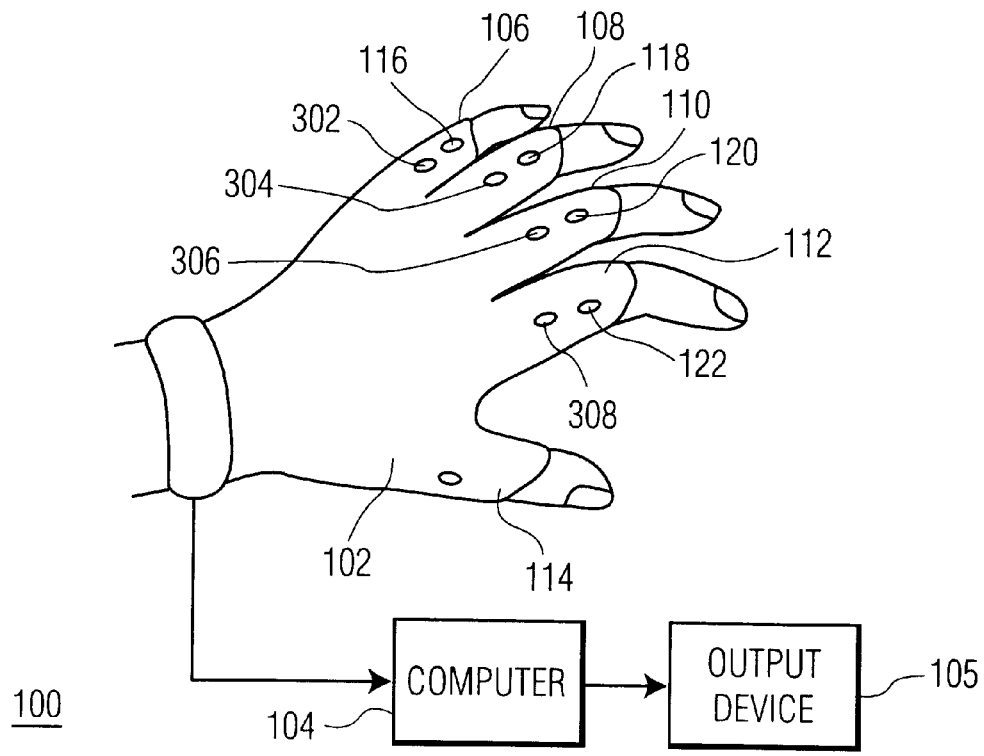
FIG. 3 is a diagram of a second embodiment of a system in the invention.

FIG. 3 shows an alternative embodiment of glove 102. Now, hits are being registered with accelerometers 302, 304, 306, 308 and 310 mounted, e.g., on the first phalanx of each finger to register a deceleration of, e.g., at least 6 g, when the finger hits a rigid surface. Preferably, this threshold is user-programmable. When a respective one of accelerometers 302–310 measures a deceleration above a certain threshold, the angle that is sensed by a particular one of sensors 116–112 mounted to the corresponding finger is registered by computer 104. A suitable low-cost accelerometer is, for example, the ACH-04-08-01 of AMP, Inc.

When typing with ten fingers, the index finger and the little finger each typically control two or more columns of keys of a QWERTY keyboard, whereas the other fingers control only one column of keys each, and the thumb controls the spacebar. Accordingly, sensors 134 and 136 are accommodated on glove 102 for sensing which of the two columns is controlled by the relevant finger. Sensors 134 and 136 sense whether the corresponding fingers are either abducted or adducted. This determines with which of the relevant columns the user is interacting. Sensor 134 comprises, for example, a magnetic reed switch mounted on index finger of glove 102 and a magnet mounted on the neighboring finger to close or open the switch dependent on index finger being abducted or adducted. Sensor 136 is functionally similar in this example. Other types of sensors can be used as alternatives for sensing the abduction or adduction. For example, alternatives comprise optical proximity sensors with LEDs and light-sensitive material on neighboring fingers, or an arrangement of strain gauges near the roots of the fingers that supplies a signal discriminating between a small angle and a wider angle between the neighboring fingers, a magnet on one finger and a Hall sensor on the neighboring finger, etc.

Figure 4:
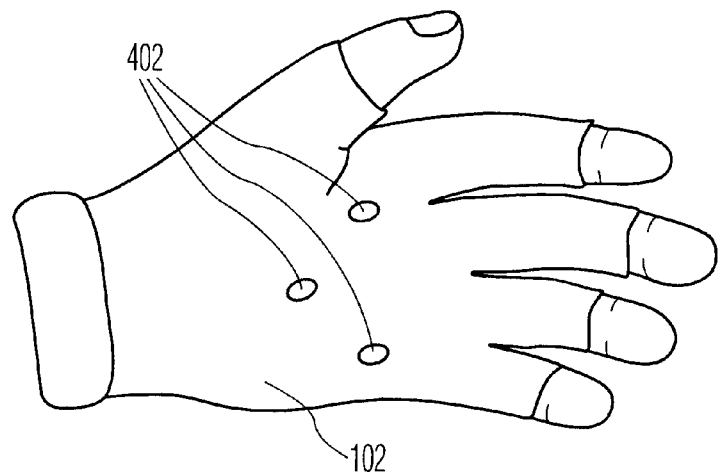
FIG. 4 is a diagram of the glove with palm-mounted switches for special function keys.

FIG. 4 shows glove 102 comprising one or more switches 402 mounted in the palm of glove 102. The virtual keys cannot be held down without additional measures. Switches 402 are used to interpret virtual keys being held when switches 402 are actuated, e.g., as the "SHIFT" key, the "ALT" key or the "CNTL" key of a PC keyboard. Note that the user should flatten his or her hand in order to actuate one of switches 402 so that an unintended entry through these switches is avoided.

Figure 5:
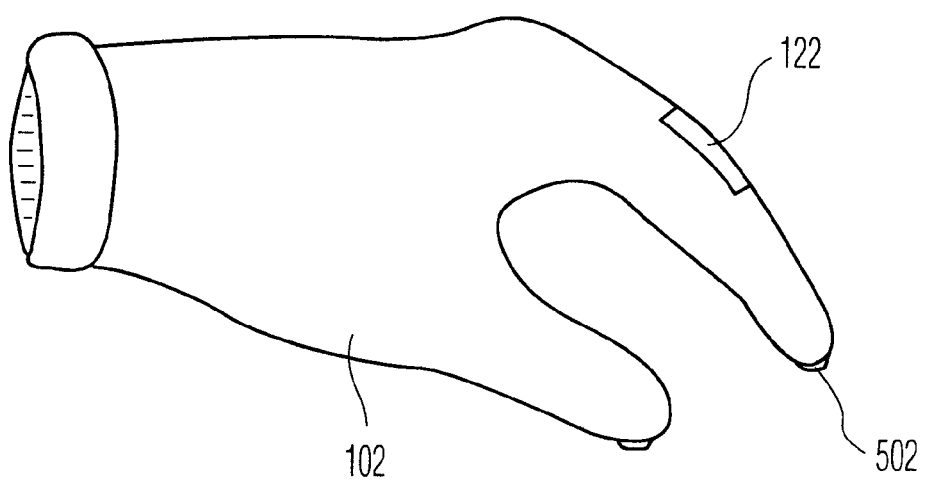
FIG. 5 is a diagram of a third embodiment of a system of the invention.

FIG. 5 is a diagram of a third embodiment of glove 102. In this embodiment, glove 102 covers the user's fingers. The discrimination between the rows and columns in a multi-row, multi column virtual keyboard is achieved as in the embodiments discussed above, i.e., by sensor 122 (for the index finger) for sensing the bending angle of the finger near the proximal interphalangeal joint (as shown) and/or near the metacarpophalangeal joint. The registering of a key hit is now done by a binary switch or another simple pressure sensor 502 mounted at the tip of each of the fingers. The thumb's key hit registering switch 504 is mounted at a position where it usually strikes the space bar in case of interacting with a QWERTY keyboard.

We claim:

1. An information processing system comprising:

a computer; and an apparatus for user-interaction with the computer; wherein:

the apparatus is mountable to a hand of the user;

the apparatus comprises a bending sensor for sensing a bending of a user's finger;

the bending sensor cooperates with the computer;

an angle at which the finger is bent at a proximal interphalangeal joint, the angle falling within a respective one of multiple ranges, determines selecting a respective one of multiple information items for entering into the computer; and the respective information item selectable per finger corresponds with a respective character.

2. The system of claim 1, wherein the apparatus further comprises a validation sensor for sensing validation of the selection of the information item.

3. The system of claim 1, wherein:

the apparatus further comprises an abduction/adduction sensor for sensing an angle between the user's finger and a neighboring one of the user's fingers;

the abduction/adduction sensor cooperates with the computer and the bending sensor to control the selection by the bending sensor.

4. The system of claim 1, wherein the apparatus further comprises a switch mountable to a palm of the user's hand, the switch being operative to control the selecting.

5. The system of claim 1, wherein the apparatus further comprises a fingerless glove.

6. The system of claim 5, wherein the apparatus communicates with the computer in a wireless manner.

7. An apparatus for enabling user-interaction with a computer wherein:

the apparatus is mountable to a hand of the user;

the apparatus comprises a bending sensor for sensing a bending of a user's finger; and the bending sensor is operative to cooperate with the computer; and an angle at which the finger is bent at a proximal interphalangeal joint, the angle falling within a respective one of multiple ranges, determines selecting a respective one of multiple information items for entering into the computer; and the respective information item selectable per finger corresponds with a respective character.

8. The apparatus of claim 7, wherein the bending sensor is mounted at least near one of the following joints of the user's finger:

a proximal interphalangeal joint; and a metacarpophalangeal joint.

9. The apparatus of claim 7, further comprising a validation sensor for sensing validation of the selection of the information item.

10. The apparatus of claim 9, wherein the validation sensor comprises at least one of the following:

a further bending sensor mounted near a metacarpophalangeal joint;

a further bending sensor mounted near the proximal interphalangeal joint;

an accelerometer mounted near a proximal phalanx of the user's finger;

the first mentioned bending sensor, the validation sensor being functionally combined therewith.

11. The apparatus of claim 9, wherein the validation sensor comprises a switch mounted at a tip of the finger of the user.

12. The apparatus of claim 7, further comprising an abduction/adduction sensor for sensing an angle between the user's finger and a neighboring one of the user's fingers, and wherein
the abduction/adduction sensor cooperates with the computer and the bending sensor to control the selection by the bending sensor.

13. The apparatus of claim 12, wherein the abduction/adduction sensor comprises at least one of the following:
a magnet and a magnetic switch mountable to different ones of the user's finger and neighboring finger;
a magnet and a Hall sensor mountable to different ones of the user's finger and neighboring finger.

14. The apparatus of claim 7, further comprising a switch mountable to the palm of the user's hand, the switch being operative to control the selection by the bending sensor.

15. The apparatus of claim 7, further comprising a fingerless glove.

16. The apparatus of claim 9, further comprising a fingerless glove.

17. The apparatus of claim 12, further comprising a fingerless glove.

18. The apparatus of claim 14 further comprising a fingerless glove.

19. The apparatus of claim 14, further comprising a wireless transmitter coupled to the sensor for wireless communication with the computer.

20. A method of enabling a user to interact with a computer, the method comprising:
sensing a bending of a user's finger; and
enabling to associate the finger's bending at a proximal interphalangeal joint at an angle in a respective range with selecting a respective information item for entering into the computer;
wherein:
the respective information item selectable per finger corresponds with a respective one of multiple characters.

21. The method of claim 20, wherein the information item represents an alphanumeric character.

22. The method of claim 21, wherein the information item represents at least one musical note.

* * * * *